(12) United States Patent
Heldberg

(10) Patent No.: US 9,951,878 B2
(45) Date of Patent: Apr. 24, 2018

(54) THERMOSTAT VALVE

(71) Applicant: ILLINOIS TOOL WORKS INC., Glenview, IL (US)

(72) Inventor: Carsten Heldberg, Kirchlinteln (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 59 days.

(21) Appl. No.: 14/413,046

(22) PCT Filed: Jul. 11, 2013

(86) PCT No.: PCT/US2013/050135
§ 371 (c)(1),
(2) Date: Jan. 6, 2015

(87) PCT Pub. No.: WO2014/011922
PCT Pub. Date: Jan. 16, 2014

(65) Prior Publication Data
US 2015/0123023 A1 May 7, 2015

(30) Foreign Application Priority Data

Jul. 11, 2012 (DE) .................. 10 2012 013 677

(51) Int. Cl.
F16K 5/06 (2006.01)
F16K 5/08 (2006.01)
F16K 5/12 (2006.01)

(52) U.S. Cl.
CPC .......... F16K 5/0647 (2013.01); F16K 5/0605 (2013.01); F16K 5/08 (2013.01); F16K 5/12 (2013.01)

(58) Field of Classification Search
CPC ...... C07C 68/04; C07C 69/96; B01J 35/1019; B01J 27/16; B01J 35/1014; F16K 5/0647;
(Continued)

(56) References Cited

U.S. PATENT DOCUMENTS 2,665,107 A * 1/1954 Blackford ................. F16K 5/10
251/288
3,520,513 A 7/1970 Okerblom
(Continued)

FOREIGN PATENT DOCUMENTS

CN 101235907 A 8/2008
CN 101484738 A 7/2009
(Continued)

OTHER PUBLICATIONS

International Search Report received in corresponding International Application No. PCT/US2013/050135, dated Apr. 11, 2013.

*Primary Examiner* — Marina Tietjen
(74) *Attorney, Agent, or Firm* — Hauptman Ham, LLP

(57) ABSTRACT

The invention relates to a thermostat valve for a combustion engine, comprising a housing which comprises several connections, and comprising a hollow valve body which comprises a shell surface which is ball-shaped at least sectionally, which valve body is mounted in the housing rotatable about a rotational axis by a rotational drive, wherein the valve body comprises at least one main opening and at least one control opening, wherein at least the control opening is limited by the shell surface and can be selectively brought into overlap with one of the connections of the housing by rotating the valve body, wherein the shell surface comprises at least one deepening in relation to the surrounding surface of the shell surface adjacent to the at least one control opening limited by the shell surface, wherein the deepening is provided such that upon rotation of the valve body, in order to bring the at least one control opening into overlap with one of the connections of the housing, fluid can flow through the deepening between the connection of the housing and the control opening already before an overlap (Continued)

Figure 4:
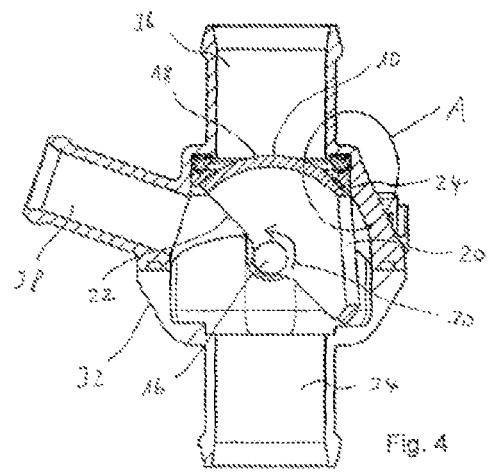

between the at least one control opening and the connection of the housing.

27 Claims, 3 Drawing Sheets

(58) Field of Classification Search
CPC . F16K 5/0605; F16K 5/12; F16K 5/08; F16K 5/10
USPC ...................................... 251/315.16, 205–208
See application file for complete search history.

(56) References Cited

U.S. PATENT DOCUMENTS

| | | | | |
|---|---|---|---|---|
| 3,603,560 | A * | 9/1971 | Merrill | F16K 27/067 251/309 |
| 4,651,775 | A * | 3/1987 | Okada | F16K 5/0605 137/625.3 |
| 4,881,718 | A * | 11/1989 | Champagne | F16K 5/0605 251/209 |
| 5,524,863 | A | 6/1996 | Davis | |
| 5,727,413 | A * | 3/1998 | Mingotti | B21D 51/08 251/315.16 |
| 5,788,220 | A * | 8/1998 | Meziere, Sr. | B60H 1/3435 251/305 |
| 5,979,873 | A * | 11/1999 | Wu | B21K 1/02 251/315.16 |
| 6,021,812 | A | 2/2000 | Iwamoto et al. | |
| 2001/0030309 | A1 | 10/2001 | Carlson et al. | |
| 2009/0114169 | A1 | 5/2009 | Heldberg et al. | |
| 2010/0148107 | A1 * | 6/2010 | Keller-Staub | F16K 51/02 251/306 |
| 2011/0284787 | A1 * | 11/2011 | Heij | F16K 11/0876 251/305 |
| 2012/0080629 | A1 | 4/2012 | Rogge et al. | |
| 2012/0085952 | A1 | 4/2012 | Hauk | |

FOREIGN PATENT DOCUMENTS

| | | |
|---|---|---|
| CN | 102449357 A | 5/2012 |
| CN | 102483166 A | 5/2012 |
| DE | 10127711 A1 | 1/2003 |
| EP | 0864788 A1 | 9/1998 |
| EP | 1108867 A2 | 6/2001 |
| WO | 0037838 A1 | 6/2000 |
| WO | 0133120 A1 | 5/2001 |

* cited by examiner

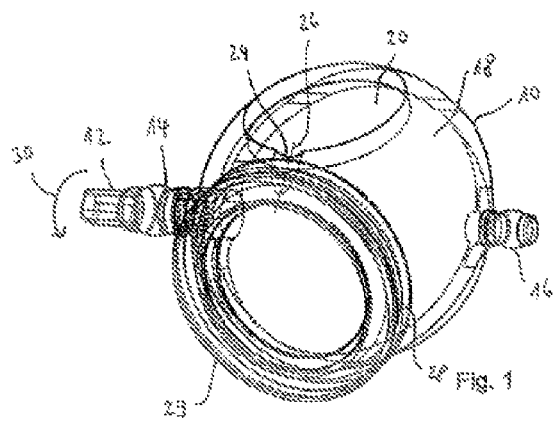
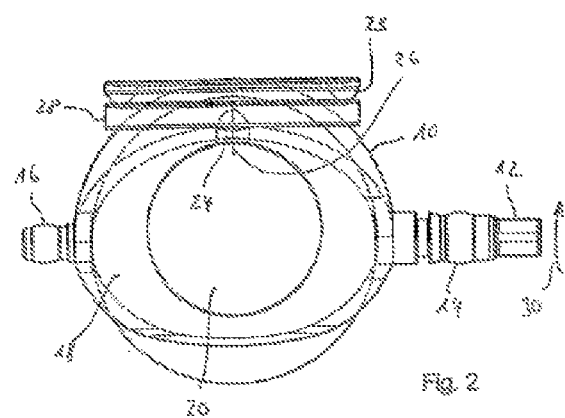
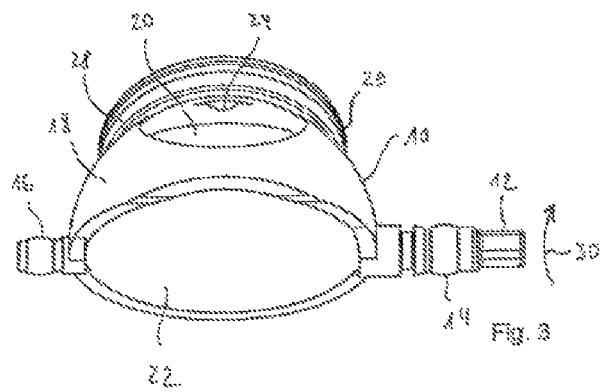

THERMOSTAT VALVE

RELATED APPLICATIONS

The present application is a National Phase of International Application Number PCT/US2013/050135 filed Jul. 11, 2013, and claims priority to German Application Number 10 2012 013 677.3 filed Jul. 11, 2012.

The invention relates to a thermostat valve for a combustion engine, comprising a housing which comprises several connections, and comprising a hollow valve body which comprises a shell surface which is ball-shaped at least sectionally, which valve body is mounted in the housing so as to be rotatable about a rotational axis by a rotational drive, wherein the valve body comprises at least one main opening and at least one control opening, wherein at least the control opening is limited by the shell surface and can be selectively brought into overlap with one of the connections of the housing by rotating the valve body.

Thermostat valves of said type are known from the prior art. By means thereof, the coolant circuit of a combustion engine of an automobile can be controlled as a function of the operating temperature of the combustion engine. DE 101 27 711 A1 discloses a valve for a cooling/heating circuit of an internal combustion engine, having a valve body which is mounted in a rotatable manner and which has a control opening. A slot is provided in the region of a delimitation of the control opening. Fluid can flow through said slot between the control opening and a connection, which is to be connected to the control opening, before the control opening itself is in overlap with the connection. This is intended to make the fluid flow increase as linearly as possible with the rotational angle of the valve body.

For this purpose, the slots must generally be of very narrow design. During operation, however, this leads to undesired noises owing to the fluid flowing through the narrow slot. Furthermore, the use of vacuum drives for rotating the valve body is difficult if such slots are provided. With vacuum drives, owing to the design thereof, the valve body cannot be held constantly at exactly one rotational angle. Rather, there is generally a resulting oscillation or vibration movement of the valve body about the desired rotational angle. In the case of the known valve, this leads to a corresponding fluctuation of the liquid flow in the region of the slot, which is likewise undesirable.

Taking the discussed prior art as a starting point, it is the object of the invention to provide a thermostat valve of the type specified in the introduction, which, while having the greatest possible flexibility with regard to the setting of the fluid flow, eliminates an undesired generation of noise. Furthermore, it should also be made possible for vacuum drives to be used without problems.

The invention achieves said object by means of the subject matter of claim 1. Advantageous refinements emerge from the dependent claims, from the description and from the figures.

The invention achieves the object by means of a thermostat valve for a combustion engine, comprising a housing which comprises several connections, and comprising a hollow valve body which comprises a shell surface which is ball-shaped at least sectionally, which valve body is mounted in the housing so as to be rotatable about a rotational axis by a rotational drive, wherein the valve body comprises at least one main opening and at least one control opening, wherein at least the control opening is limited by the shell surface and can be selectively brought into overlap with one of the connections of the housing by rotating the valve body, wherein the shell surface comprises at least one deepening in relation to the surrounding surface of the shell surface adjacent to the at least one control opening limited by the shell surface, wherein the deepening is provided such that upon rotation of the valve body, in order to bring the at least one control opening into overlap with one of the connections of the housing, fluid can flow through the deepening between the connection of the housing and the control opening already before an overlap between the at least one control opening and the connection of the housing.

The thermostat valve may in particular be a thermostat valve for an internal combustion engine of an automobile, by means of which thermostat valve the coolant circuit of the internal combustion engine can be controlled. The fluid controlled by the thermostat valve may correspondingly be a cooling or heating fluid. The housing may for example have at least three connections, for example for connecting to an engine cooling system (engine connection), a cooler (cooler connection) and a bypass (bypass connection). The valve body may be mounted in the housing so as to be rotatable for example between two end positions. The valve body has a main opening on one side and has at least one control opening on the other side. Said valve body may also have multiple control openings. The number of control openings is dependent on the number of housing connections and the desired switching positions. The main opening may also be formed in the region of the shell surface. It is possible for the valve body to have a hemispherical shape, wherein the at least one control opening is formed in the hemispherical shell surface. The main opening may then be formed by the "missing" sphere half of the hemisphere shape. It is however also possible, for example, for the main opening to be arranged in the region of the axis of rotation of the valve body, and to thus remain connected to a water pump connection, for example, at all times. Such multi-way valves are known per se.

According to the invention, at least one deepening or depression is provided in the shell surface of the valve body, specifically in that region of the shell surface which is adjacent to the at least one control opening. In contrast to the prior art, therefore, there is formed in the shell surface not a continuous slot but rather merely a deepening with a base. Here, the deepening extends into the control opening. In this way, during a rotation of the valve body in order to bring the at least one control opening into overlap with one of the connections of the housing, fluid can flow between the main opening, or the fluid connection connected to the main opening, and the control opening, or the respective connection of the housing, already before the respective connection of the housing is overlapped by the control opening, specifically through the deepening. Therefore, starting from the time at which an adequate angle of rotation of the valve body is reached, the deepening, owing to its connection to the control opening, produces fluidic communication between the respective housing connection and the main opening or the connection connected to the main opening, before the control opening itself passes into a position of adequate overlap with the housing connection during the course of the rotation of the valve body. A multiplicity of different shapes is basically conceivable for the deepening. Said deepening may for example have a (partially) elliptical shape.

According to the invention, upon the commencement of the connection between the control opening and the housing connection, the opening cross section is defined not only by the width and length of the deepening but rather additionally by a further dimension, specifically the depth of the deepening. This permits more flexible setting of the initially flowing fluid flow in comparison to the formation of a slot according to the prior art. It is thereby in turn possible, firstly, for a very small volume flow to be set upon the commencement of the respective valve opening. Secondly, undesired noises such as arise in the prior art are eliminated.

Through suitable selection of the geometry of the deepening, in particular of the width, length and/or depth thereof, it is possible for a defined characteristic curve for the fluid flow as a function of the angle of rotation of the valve body to be set in an extremely flexible manner. The deepening may for example have a depth and/or width which decreases, in the radial direction or in the direction of rotation of the valve body respectively, starting from the control opening. The base of the deepening and thus the depth thereof may also vary, in particular in manifold form, in the direction of rotation of the valve body.

In one refinement, the deepening may be provided such that the fluid flow flowing through the deepening likewise increases with increasing rotational angle during the rotation of the valve body in order to bring the at least one control opening into overlap with one of the connections of the housing. The fluid flow thus increases upon the commencement of the opening of the valve or of the passage, provided by the deepening, between the at least one control opening and the corresponding connection of the housing. Here, it is possible in particular to set a particularly slow increase of the fluid flow upon the commencement, wherein the fluid flow then increases more intensely with increasing rotational angle. Thus, by contrast to the prior art, it is specifically not the case that a linear characteristic curve of the fluid flow as a function of the angle of rotation of the valve body is generated. Rather, the deepening according to the invention makes it possible to set a very small volume flow in the initial range of the valve opening. Upon the commencement of the opening of the thermostat valve, a very flat characteristic curve, that is to say a very small volume flow, is desirable. This is the case in particular in the event of a cold start of the internal combustion engine, because at this time, it is often the case that very cold coolant is extracted from the cooler of the internal combustion engine, and even small volume flows are adequate for temperature setting. By contrast, during normal operation of the internal combustion engine, the coolant extracted from the cooler is considerably warmer, and a considerably greater volume flow is required for the desired temperature setting of the internal combustion engine. In a further refinement, the deepening may be provided such that the fluid flow flowing through the deepening increases exponentially with increasing rotational angle during the rotation of the valve body. When the control opening of the valve body comes into overlap with the respective connection of the housing, the fluid flow which then takes place substantially through the control opening can increase further approximately linearly with the rotational angle of the valve body.

In a further refinement, the deepening may be provided such that the fluid flow flowing through the deepening remains constant at least over a defined rotational angle range during the rotation of the valve body. It is thus possible, through suitable selection in particular of the depth and/or width of the deepening, to generate a hysteresis window over small angle changes, that is to say the volume flow remains constant within a defined rotational angle range. Said setting of the fluid flow, which is constant at least in regions, is made possible according to the invention by virtue of the opening cross section provided by the deepening being defined not only by the width and length, as is the case with a slot according to the prior art, but rather additionally by a further dimension, specifically the depth. Here, it may be provided in particular that, proceeding from the at least one control opening in a radial direction or in a direction of rotation of the valve body, the depth of the deepening initially remains constant over a first region, and the depth subsequently decreases. In the first region, in which the depth of the deepening is constant, the width of the deepening may for example also be constant, such that in said first region and thus rotational angle region, the fluid flow on the whole does not change.

As already mentioned, for the rotational drive, use may for example be made of a vacuum drive which comprises, for example, a so-called vacuum capsule with variable negative pressure. Such vacuum drives are inexpensive and structurally simple. As likewise explained in the introduction, however, such vacuum drives, owing to their design, cannot move to a certain rotational angle position and remain stationary at said position. Rather, a rapid sequence of small forward and backward movements occurs owing to a pulsed negative pressure. The valve body correspondingly performs an oscillation or vibration movement around the set rotational angle. By means of the configuration according to the invention of the deepening, it is possible, despite said vibration movement of the valve body, to reliably prevent the occurrence of an irregularity of the fluid flow through the thermostat valve when a corresponding rotational angle is set. Alternatively, the rotational drive may self-evidently also comprise an electric drive or any other desired suitable drive.

In a further refinement, it may be provided that the shell surface comprises several deepenings in relation to the surrounding surface of the shell surface adjacent to the at least one control opening limited by the shell surface, wherein the deepenings are each provided such that, during the rotation of the valve body, fluid can flow through the respective deepening between the connection of the housing and the control opening already before an overlap between the at least one control opening and the connection of the housing. It may furthermore be provided that the valve body comprises several control openings limited by the shell surface, which upon rotation of the valve body can selectively be brought into overlap with one of the connections of the housing, respectively. In a further refinement in this regard, it may be provided that each of the control openings comprises at least one deepening in relation to the surrounding surface of the shell surface, wherein the deepenings are in each case provided such that, during the rotation of the valve body, fluid can flow through the respective deepening between the connection of the housing and the respective control opening already before an overlap between the respective control opening and the connection of the housing. Here, each of the control openings may in turn have several deepenings. At least some of the deepenings may differ with regard to their length, width and/or depth.

In a further refinement, the deepening may also be in the form of a quarter-sphere recessed in the shell surface. In this way, the fluid flow through the deepening can be influenced in a targeted manner, so as for example to attain a considerable reduction in pressure losses when the valve is wide open in the case of a situation where the inlet and outlet of the thermostat valve are arranged not diametrically opposite but rather for example at an angle with respect to one another. Such an arrangement of the inlet and outlet is often necessary in order to be able to satisfy the installation space requirements.

The invention also relates to a combustion engine of an automobile comprising a thermostat valve according to the invention.

Figure 5:
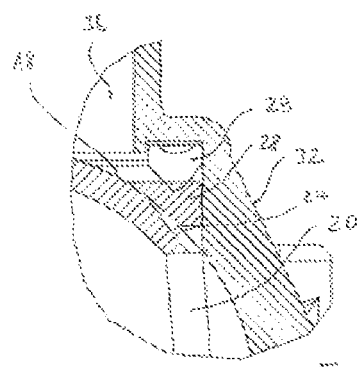
Figure 6:
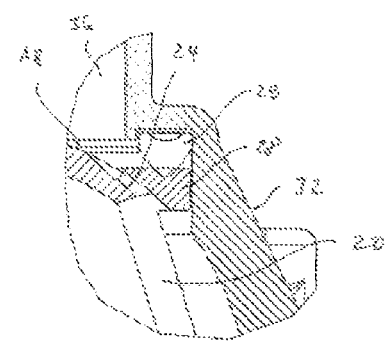
Figure 7:
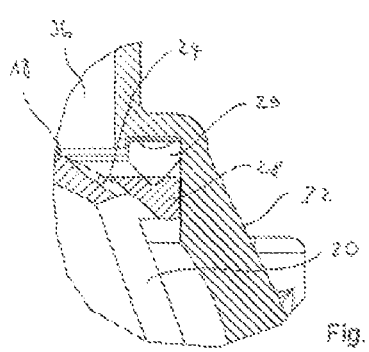
Figure 8:
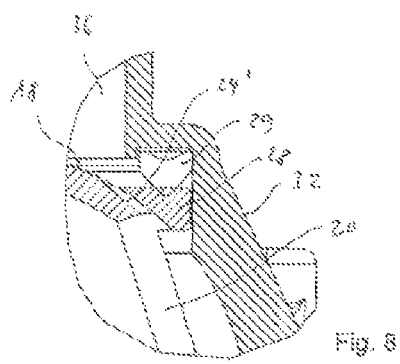
Figure 9:
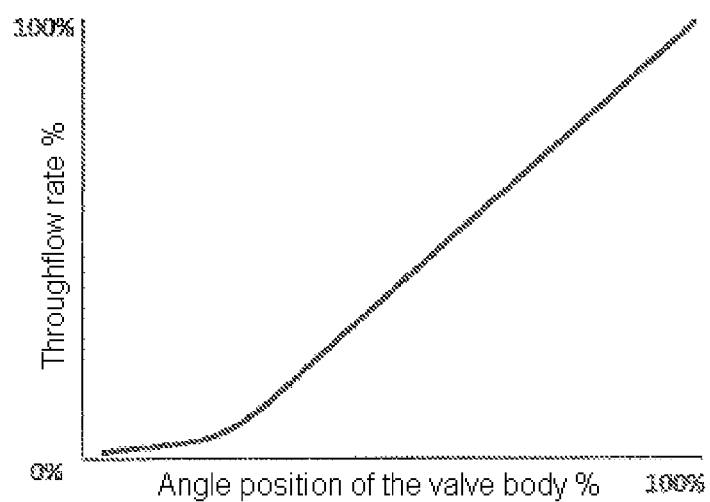

Exemplary embodiments of the invention will be explained in more detail below on the basis of figures, in which, in each case schematically:

FIG. 1 shows a valve body of a thermostat valve according to the invention in a first perspective and partially transparent view, FIG. 2 shows the valve body from FIG. 1 in a plan view in a partially transparent illustration, FIG. 3 shows the valve body from FIG. 1 in a further perspective view, FIG. 4 shows a thermostat valve according to the invention in a sectional view, FIG. 5 shows an enlarged view of the detail A from FIG. 4 in a first operating state, FIG. 6 shows the view from FIG. 5 in a second operating state, FIG. 7 shows the view from FIG. 5 in a third operating state, FIG. 8 shows a detail, corresponding to the view in FIG. 6, of a second exemplary embodiment, and FIG. 9 shows a diagram illustrating the increase of the fluid flow through the thermostat valve according to the invention as a function of the rotational angle of the valve body.

Unless stated otherwise, in the figures, the same reference signs are used to denote identical features. FIGS. 1 to 3 show a valve body 10 of a thermostat valve according to the invention for a combustion engine of an automobile. To the valve body 10 there is connected a drive shaft 12 which is connected to a rotational drive (not shown). The rotational drive may be for example a vacuum drive. The valve body 10 is rotatably mounted in a housing by means of bearings 14, 16, as can be seen for example in FIG. 4. In the example shown, the valve body 10 is of a hemispherical shell shape. The shell surface 18, which is correspondingly likewise of hemispherical shape, of the valve body 10 delimits a control opening 20, which is circular in the example shown, of the valve body. The "missing" half of the sphere owing to the hemispherical shape forms a main opening 22 of the valve body 10.

It can also be seen in FIGS. 1 to 3 that the shell surface 18 comprises a deepening 24 in relation to the surrounding surface of the shell surface 18 adjacent to the control opening 20 limited by the shell surface. Here, the deepening 24 runs into the control opening 20. As can be seen in FIG. 1, the deepening 24 has a (partially) elliptical shape. Proceeding from the control opening 20 in a radial direction, as illustrated by reference sign 26 in FIGS. 1 and 2, the depth of the deepening 24 decreases. For illustrative purposes, in FIGS. 1 and 3, the reference sign 28 indicates an annular seal of a housing connection, which is to be brought into overlap with the control opening 20, of the thermostat valve. Reference sign 29 indicates an associated elastomer ring which, during operation, serves to provide an adequate contact pressure between the valve body 10, in particular the shell surface 18 thereof, and the corresponding housing connection. To bring the control opening 20 into overlap with the housing connection which is sealed off by the annular seal 28, the valve body 10 must be rotated by means of the rotational drive (not shown) along the direction indicated in FIGS. 1 to 3 by the reference sign 30. This has the result that, already before a state of overlap is attained between the control opening 20 and the housing connection, a connection is produced, specifically owing to the deepening 24, between the control opening 20 and the housing connection which is sealed off by the annular seal 28. Said deepening permits a throughflow of the fluid already before said overlap between the control opening 20 and the housing connection occurs.

It is the intention to explain this further on the basis of FIGS. 4 to 8. FIG. 4 shows, in a sectional view, the valve body 10 from FIGS. 1 to 3 in a housing 32 of the thermostat valve according to the invention. The housing 32 has three connections, specifically an engine connection 34 to an engine cooling system of the combustion engine, a cooler connection 36 to a cooler of the combustion engine, and a bypass connection 38 to a bypass line which bypasses the cooler. The configuration of the connections of a thermostat valve of said type is known per se. If the engine connection 34 is now to be connected to the cooler connection 36, for example, the valve body 10 must be rotated by means of the rotational drive counterclockwise in FIG. 4, as indicated by the arrow 30.

For further explanation, reference is now made to the detail illustrations of FIGS. 5 to 7. In the initial state shown in FIG. 5, a fluid flow between the engine connection 34 and the cooler connection 36 is still prevented entirely, because the shell surface 18 completely covers the cooler connection 36, and the deepening 24 is situated beneath the seal 28. If the valve body 10 is then rotated corresponding to the direction of rotation of the arrow 30 in FIG. 4, the deepening comes into overlap with the cooler connection 36, and a connection is produced by the deepening 24 between the cooler connection 36 and the control opening 20 and thus the engine connection 34, as shown in FIG. 6. It can also be seen in FIG. 6 that the deepening 24 is configured such that the fluid flow initially increases with the rotational angle. In particular, the depth of the deepening 24 initially increases in a direction opposite to the direction of rotation. If the valve body 10 is then rotated further along the direction of rotation 30, a portion of the deepening 24 is reached which has a substantially constant depth, as can be seen in FIG. 7. It can be seen for example in FIG. 1 or 2 that, in said region of the deepening 24, the width of the deepening is also constant. There is thus a defined rotational angle range in which the fluid flow flowing through the deepening 24 no longer changes but rather remains constant. In this way, specifically when using a vacuum drive as a rotational drive, it is possible to prevent a situation in which an oscillating movement of the valve body 10 caused by the vacuum drive results in a corresponding fluctuation of the fluid flow. If the valve body 10 is then rotated further along the direction of rotation 30, the control opening 20 comes into overlap with the cooler connection 36 of the housing 32, such that, finally, the maximum throughflow cross section between the engine connection 34 and the cooler connection 36 is provided, while the shell surface 18 simultaneously closes the connection to the bypass connection 38.

FIG. 8 illustrates an alternative refinement of a deepening 24'. The refinement of the thermostat valve and of the valve body according to FIG. 8 corresponds substantially to the refinement shown in FIGS. 1 to 7. By contrast to the refinement according to FIGS. 1 to 7, however, the deepening 24' in the refinement according to FIG. 8 has a depth which decreases linearly in the direction of rotation of the valve body 10, that is to say along the arrow direction 30. In particular, there is no region with a constant depth, such as can be seen in the exemplary embodiment of FIGS. 1 to 7.

FIG. 9 shows a diagram illustrating the increase of the fluid flow (throughflow rate) with increasing rotational angle of the valve body (angle position) between a fully closed position (0%) and a fully open position (100%). It can be seen that, in particular upon the commencement of the rotation of the valve body proceeding from its fully closed position into the open position, when fluid can flow only through the deepening, a slow increase of the fluid flow takes place. When the control opening of the valve body comes into overlap with the respective connection of the housing, the increase of the fluid flow then changes into an approximately linear increase, until finally the fully open position is reached.

With the thermostat valve according to the invention, the fluid flows can be set flexibly in a targeted manner. An undesired generation of noise is reliably prevented. At the same time, as a result of the flexible configuration of the deepening 24, 24' both with regard to its length and also with regard to its width and its depth, flexible setting of the fluid flow is possible specifically upon the commencement of the opening of a connection between two connections of the housing 32. In this way, it is also made possible for vacuum drives to be used without problems as a rotational drive for the valve body 10.

The invention claimed is:

1. Thermostat valve for a combustion engine, comprising a housing which comprises several connections, and comprising a hollow valve body which comprises a shell surface which is ball-shaped at least sectionally, which valve body is mounted in the housing rotatable about a rotational axis by a rotational drive, wherein the valve body comprises at least one main opening and at least one control opening, wherein at least the control opening is limited by the shell surface and can be selectively brought into overlap with one of the connections of the housing by rotating the valve body, wherein the shell surface comprises at least one deepening in relation to the surrounding surface of the shell surface adjacent to the at least one control opening limited by the shell surface, wherein the deepening is provided such that upon rotation of the valve body, in order to bring the at least one control opening into overlap with one of the connections of the housing, fluid can flow through the deepening between the connection of the housing and the control opening already before an overlap between the at least one control opening and the connection of the housing,
wherein at least one of:
(i) the deepening is provided such that the fluid flow flowing through the deepening increases exponentially upon rotation of the valve body with increasing rotational angle;
(ii) a central axis of the main opening and a central axis of the control opening have directions that are different from each other; or
(iii) the deepening is such that a defined rotational angle range in which an amount of fluid flow flowing through the deepening no longer changes but rather remains constant, thereby preventing oscillating movement of the valve body caused by a valve body drive, and wherein the deepening is such that if the valve body is rotated further beyond this rotational angle range, the control opening comes into overlap with a connection of the connections, such that maximum throughflow cross section is provided.

2. Thermostat valve according to claim 1, wherein the deepening comprises a depth and/or width decreasing, starting from the control opening.

3. Thermostat valve according to claim 1, wherein the deepening is provided such that the fluid flow flowing through the deepening increases upon rotation of the valve body with increasing rotational angle.

4. Thermostat valve according to claim 1, wherein the deepening is provided such that the fluid flow flowing through the deepening increases exponentially upon rotation of the valve body with increasing rotational angle.

5. Thermostat valve according to claim 1, wherein the deepening is provided such that the fluid flow flowing through the deepening remains constant at least defined over the rotational angle area upon rotation of the valve body.

6. Thermostat valve for a combustion engine, comprising a housing which comprises several connections, and comprising a hollow valve body which comprises a shell surface which is ball-shaped at least sectionally, which valve body is mounted in the housing rotatable about a rotational axis by a rotational drive, wherein the valve body comprises at least one main opening and at least one control opening, wherein at least the control opening is limited by the shell surface and can be selectively brought into overlap with one of the connections of the housing by rotating the valve body, wherein the shell surface comprises at least one deepening in relation to the surrounding surface of the shell surface adjacent to the at least one control opening limited by the shell surface, wherein the deepening is provided such that upon rotation of the valve body, in order to bring the at least one control opening into overlap with one of the connections of the housing, fluid can flow through the deepening between the connection of the housing and the control opening already before an overlap between the at least one control opening and the connection of the housing,
wherein the rotational drive comprises a vacuum drive which comprises a vacuum capsule with variable negative pressure.

7. Thermostat valve according to claim 1, wherein the rotational drive comprises an electric drive.

8. Thermostat valve according to claim 1, wherein the shell surface comprises several deepenings in relation to the surrounding surface of the shell surface adjacent to the at least one control opening limited by the shell surface, wherein the deepenings are each provided such, that upon rotation of the valve body fluid can flow through the respective deepening between the connection of the housing and the control opening already before an overlap between the at least one control opening and the connection of the housing.

9. Thermostat valve according to claim 1, wherein the valve body comprises several control openings limited by the shell surface, which upon rotation of the valve body can selectively be brought into overlap with one of the connections of the housing, respectively.

10. Thermostat valve according to claim 9, wherein each of the control openings comprises at least one deepening in relation to the surrounding surface of the shell surface, wherein the deepenings are in each case provided such that upon rotation of the valve body fluid can flow through the respective deepening between the connection of the housing and the respective control opening already before an overlap between the respective control opening and the connection of the housing.

11. Thermostat valve according to claim 8, wherein at least some of the deepenings differ with regard to their length, width and/or depth.

12. Combustion engine of an automobile, comprising a thermostat valve according to claim 1.

13. Thermostat valve, comprising
a rotational drive;
a housing comprising two or more connections;

a valve body mounted in the housing and configured to be rotatable about a rotational axis by the rotational drive, the valve body comprising:
  a shell;
  a control opening formed in the shell, the control opening being configured to be selectively brought into overlap with one of the connections of the housing by rotating the valve body;
  a deepening formed in the shell adjacent to the control opening, the deepening being configured to extend to the control opening in the direction in which the valve body rotates; and
a main opening limited by the shell and configured to connect to the control opening, said main opening being free of deepening, wherein at least one of:
  (i) the valve body has a hemispherical shape, the control opening is formed in the hemispherical shell, and the main opening is formed by the missing sphere half of the hemisphere shape;
  (ii) the housing comprises a first connection connecting to an engine cooling connection, a second connection connecting to a cooler, and a third connection connecting to a bypass, and said first connection and the second connection extend in the same direction, and the deepening is formed at the upstream side of the control opening in the rotational direction of the valve body; or
  (iii) the depth of the deepening remains constant at least over a defined rotational angle area upon rotation of the valve body, and the depth subsequently decreases.

14. Thermostat valve according to claim 13, wherein the valve body has the hemispherical shape, the control opening is formed in the hemispherical shell, and the main opening is formed by the missing sphere half of the hemisphere shape.

15. Thermostat valve according to claim 13, wherein the deepening has an elliptical shape at least partially.

16. Thermostat valve according to claim 13, wherein the deepening is in the form of a quarter-sphere recessed in the shell surface.

17. Combustion engine of an automobile according to claim 12, wherein the housing comprises a first connection connecting to an engine cooling connection, a second connection connecting to a cooler, and a third connection connecting to a bypass, and said first connection and the second connection extend in the same direction, and the deepening is formed at the upstream side of the control opening in the rotational direction of the valve body.

18. Thermostat valve according claim 13, wherein the fluid flow flowing through the deepening increases exponentially upon rotation of the valve body with increasing rotational angle due to an elliptical shape.

19. Thermostat valve according to claim 13, wherein the depth of the deepening remains constant at least over the defined rotational angle area upon rotation of the valve body, and the depth subsequently decreases.

20. Thermostat valve according to claim 1, wherein an area of the main opening is larger than an area of the control opening.

21. Thermostat valve according to claim 1, wherein the hollow valve body has a hemispherical shell surface.

22. Thermostat valve according to claim 21, wherein the main opening is formed by a sphere half of the hemispherical shell surface.

23. Thermostat valve according to claim 1, wherein the central axis of the main opening and the central axis of the control opening have directions that are different from each other.

24. Thermostat valve according to claim 1, wherein the valve body is a solid valve body.

25. Thermostat valve according to claim 1, wherein an outer surface of the valve body establishing the shell surface is less than a hemisphere surface.

26. Thermostat valve according to claim 1, wherein the deepening is such that a defined rotational angle range in which an amount of fluid flow flowing through the deepening no longer changes but rather remains constant with rotation of the valve body.

27. Thermostat valve according to claim 1, wherein the deepening is such that the defined rotational angle range in which the amount of fluid flow flowing through the deepening no longer changes but rather remains constant, thereby preventing oscillating movement of the valve body caused by the valve body drive, and wherein the deepening is such that if the valve body is rotated further beyond this rotational angle range, the control opening comes into overlap with the connection of the connections, such that maximum through-flow cross section is provided.

* * * * *